United States Patent [19]

Gildon

[11] 4,411,571
[45] Oct. 25, 1983

[54] HAY BALE RETRIEVING AND TRANSPORTING TRAILER

[76] Inventor: Troy Gildon, Rte. 3, Box 59, Duncan, Okla. 73533

[21] Appl. No.: 252,792

[22] Filed: Apr. 13, 1981

[51] Int. Cl.³ ............................................. A01D 87/12
[52] U.S. Cl. ................... 414/24.5; 414/551; 414/911
[58] Field of Search ........ 414/24.5, 24.6, 551, 414/555, 684, 911; 56/478, 480, 473.5; 280/462, 463

[56] References Cited

U.S. PATENT DOCUMENTS

| | | | |
|---|---|---|---|
| 3,677,428 | 7/1972 | Mallett | 414/739 |
| 3,841,504 | 10/1974 | Spasuik | 414/551 |
| 3,952,895 | 4/1976 | Campbell | 414/481 |
| 4,032,184 | 6/1977 | Blair | 294/88 |
| 4,042,140 | 8/1977 | McFarland | 414/24.5 |
| 4,044,906 | 8/1977 | Schrag et al. | 414/485 |
| 4,044,963 | 8/1977 | Hostetler | 414/24.6 |
| 4,050,598 | 9/1977 | Schurz | 414/24.5 |
| 4,090,624 | 5/1978 | Krein et al. | 414/24.6 |
| 4,103,794 | 8/1978 | Shaw | 414/911 |
| 4,120,405 | 10/1978 | Jones et al. | 414/24.5 |
| 4,148,399 | 4/1979 | Carter et al. | 414/732 |
| 4,204,790 | 5/1980 | Baxter | 414/24.5 |
| 4,248,561 | 2/1981 | Graves | 414/24.5 |
| 4,299,522 | 11/1981 | Barton et al. | 414/24.5 |

FOREIGN PATENT DOCUMENTS 1065808  11/1979  Canada .................. 414/24.5

*Primary Examiner*—Robert J. Spar
*Assistant Examiner*—Ken Muncy
*Attorney, Agent, or Firm*—Laney, Dougherty, Hessin & Beavers

[57] ABSTRACT

A hay bale retrieving and transporting trailer which includes a rectangular frame mounted upon a pair of ground-engaging wheels and carrying a pair of oppositely disposed bale loading and supporting cradles pivotally mounted on the frame. The cradles are actuated by a pair of piston and cylinder subassemblies which extend between the frame and the cradles for moving the cradles from a first, pick-up position to a second, transporting position. The trailer is further provided with a horizontally extending towing tongue having one end pivotally connected at the center of the trailer frame. A piston and cylinder is connected between the trailer frame and the tongue to swing the tongue to a selected angle with respect to the fore-and-aft axis of the trailer frame so that the trailer can be towed in a laterally offset position from a towing vehicle.

9 Claims, 5 Drawing Figures

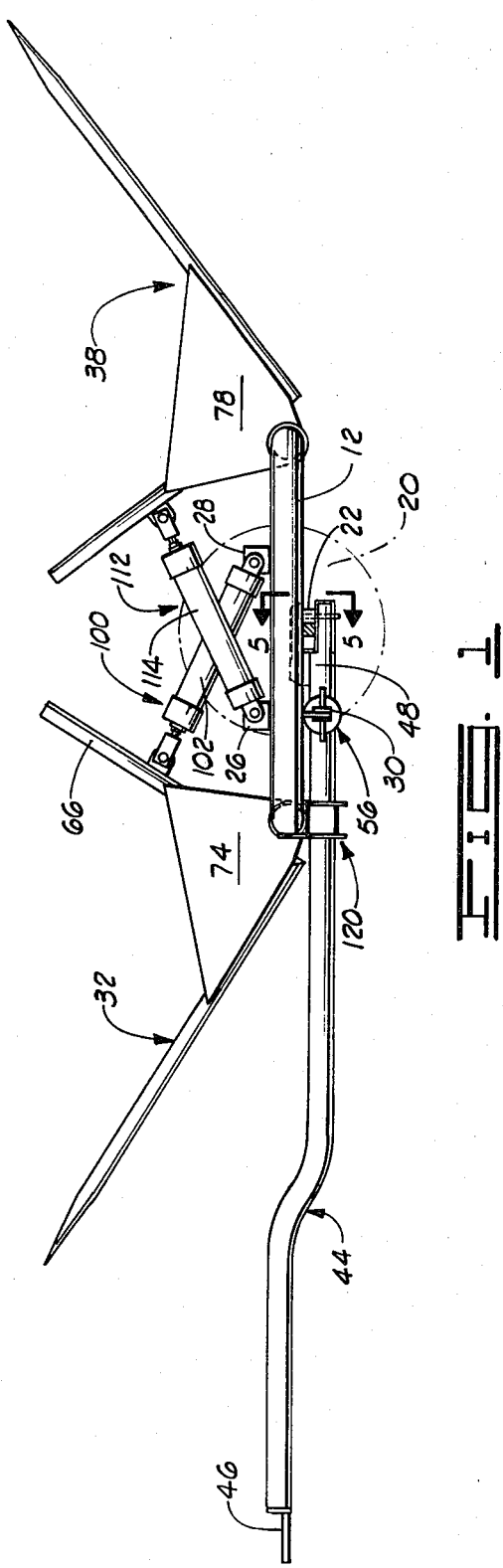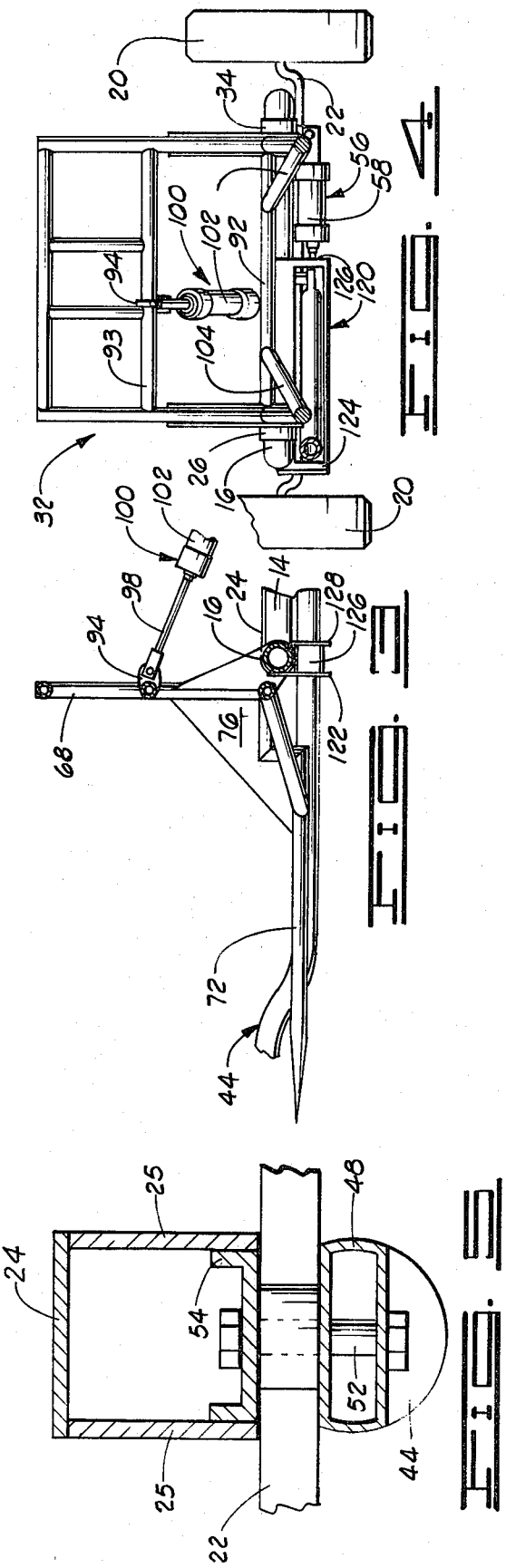

HAY BALE RETRIEVING AND TRANSPORTING TRAILER

BACKGROUND OF THE INVENTION

1. Field of the Invention

This invention relates to hay bale transporting apparatus, and more particularly, to apparatus which can be used to pick up from a position in the field, and then transport, multiple hay bales.

2. Brief Description of the Prior Art

With the advent of large cylindrical hay bales in recent years, various types of bale retrieving and transporting systems have been proposed, and many of these have been manufactured and are in use. In some instances, the pick-up and transport apparatus is self-propelled, and may include one or more conveyors on the apparatus for shifting the hay bales once they have been loaded on a bed or platform forming a part of the vehicle. Systems of this type include those which are shown in U.S. Pat. Nos. 3,677,428 to Mallott; 4,032,184 to Blair; 4,044,963 to Hostetler; 4,148,399 to Carter et al.; and 4,090,624 to Krein et al.

In another type of system, the structure which carries the hay bales is pulled or towed by some sort of vehicle. Frequently, such trailer-type structures include cradles, spikes, arms or the like which will impale, slide under or encircle a hay bale lying in the field to enable the hay bale to then be lifted up to a loaded and transport position on the trailer. Typical of such structures are those shown in U.S. Pat. Nos. 3,841,504 to Spasuik; 4,042,140 to McFarland; 4,248,561 to Graves, and 3,952,895 to Campbell.

In some instances, the trailer-type or towed bale transporting apparatus is equipped with plural pick-up mechanisms which enable a hay bale lying ahead of the trailer and in the direction of travel of the towing vehicle to be picked up as the towing vehicle moves ahead, and also enable hay bales to the rear of both the towing vehicle and the trailer to be picked up as the towing vehicle is backed. These versatile bale loading and transporting systems sometimes achieve the capability of picking up bales ahead of the trailer, as well as behind the trailer, by including a towing tongue which is swung to a selected angle with respect to the fore-and-aft axis of the trailer and the line of travel of the towing vehicle. This is accomplished by the use of a hydraulic piston and cylinder carried on the trailer. This causes the trailer to move to one side of the line of travel of the towing vehicle, and thus to have an unobstructed approach to the hay bale lying ahead in the field. Patented structures of this type include those shown in U.S. Pat. Nos. 4,204,790 to Baxter; 4,042,140 to McFarland; 4,248,561 to Graves, and 4,044,906 to Schrag et al.

BRIEF DESCRIPTION OF THE PRESENT INVENTION

The present invention provides a hay bale retrieving and transporting apparatus adapted to be towed behind a tractor or other towing vehicle, and including a rectangular frame mounted upon a pair of ground-engaging wheels and carrying a pair of oppositely disposed bale loading and supporting cradles pivotally mounted on the frame at the front and the rear thereof. The cradles are actuated to pivot about a horizontal axis by piston and cylinder subassemblies associated with each, and extending between the frame and the respective cradles. The trailer is further provided with a horizontally extending towing tongue having one end pivotally connected at substantially the center of the rectangular frame. A piston and cylinder is connected between the trailer frame and the tongue to swing the tongue to a selected angle with respect to the fore-and-aft axis of the trailer frame so that the trailer can be towed in a laterally offset position from the towing vehicle.

An object of the present invention is to provide a hay bale retrieving and transporting apparatus which is simply constructed yet is very strong mechanically due to its relatively few moving parts and the simplicity of its construction.

A further object of the invention is to provide a hay bale pickup and transport device which can be towed directly behind or to one side of a towing vehicle and can be used for picking up hay bales ahead of the apparatus or behind the apparatus and holding them in an elevated position during transport to the location for unloading.

Another object of the invention is to provide a trailer carrying hydraulically operated pickup cradles at the forward and rear ends thereof for picking up and carrying round hay bales, which trailer is characterized in having a long and trouble-free operating life.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 1 is a side elevation view of a hay bale retrieving and transporting trailer constructed in accordance with the present invention and illustrating in dashed lines the location of one of the ground-engaging wheels which support the trailer as shown in FIG. 2.

FIG. 3 is a sectional view taken along line 3—3 of FIG. 2.

FIG. 4 is a sectional view taken along line 4—4 of FIG. 2.

FIG. 5 is a sectional view taken along line 5—5 of FIG. 1.

DETAILED DESCRIPTION OF A PREFERRED EMBODIMENT OF THE INVENTION

Figure 2:
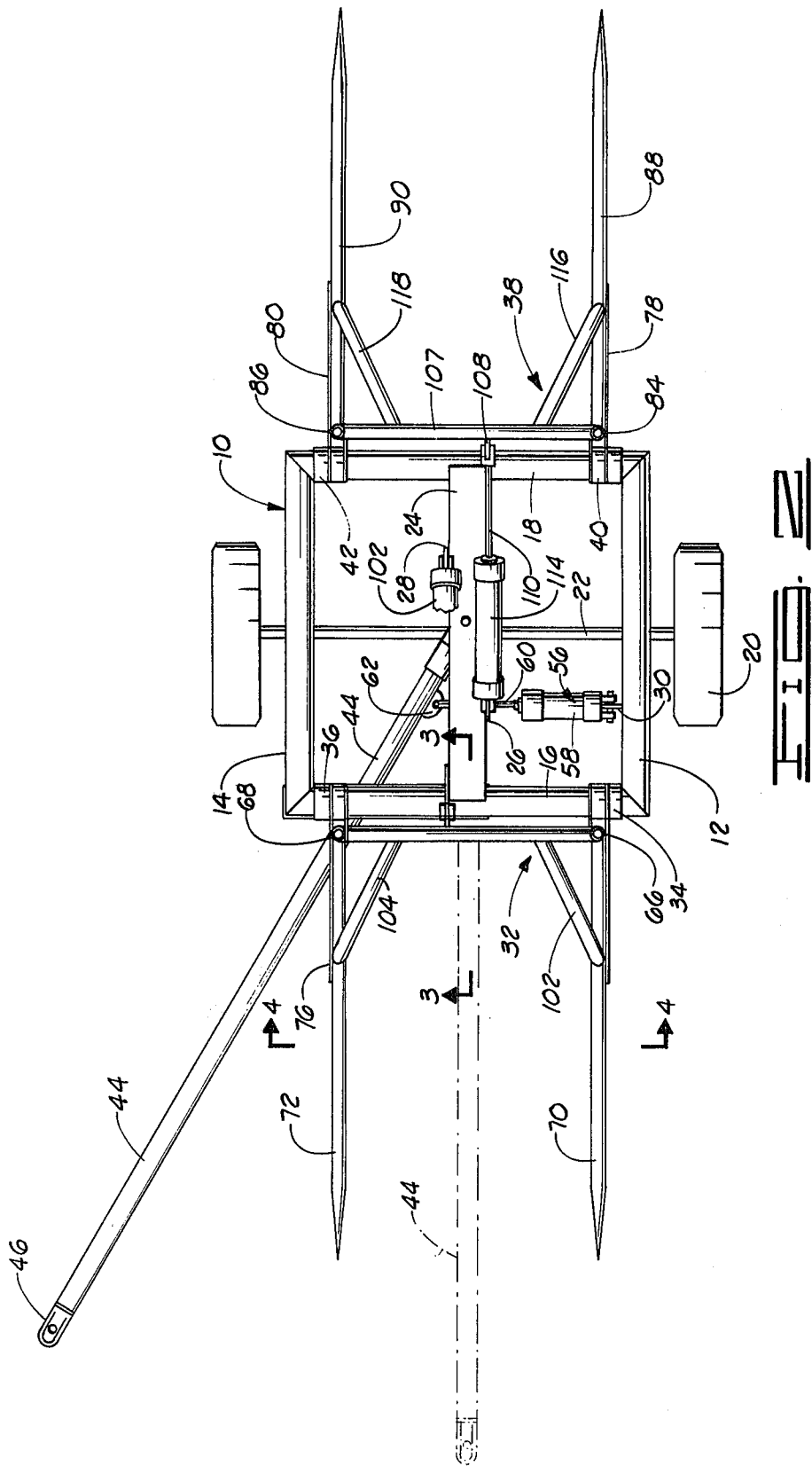
FIG. 2 is a plan view of the trailer of the invention.

The bale retrieving and transporting trailer of the invention includes a rectangular frame 10 which, in the illustrated embodiment of the invention, is formed of a pair of parallel lateral tubular members 12 and 14 and front and rear tubular members 16 and 18, respectively. The frame 10 is supported on a pair of ground-engaging transport wheels 20 journaled on the opposite ends of a transverse axle 22 which projects across the center of the frame 10 and is secured to the underside thereof. A centrally located fore-and-aft plate 24 has its opposite ends secured to the upper sides of the front and rear tubular members 16 and 18.

The centrally located fore-and-aft plate 24 has a forward cylinder attachment lug 26 secured to, and projecting upwardly from, one of its lateral side edges. Spaced rearwardly along the fore-and-aft plate 24, and secured to the opposite lateral edge thereof is an upwardly projecting rear cylinder attachment lug 28. A downwardly projecting towing tongue cylinder attachment lug 30 is secured to the lower side of the lateral tubular member 12 of the rectangular frame 10 at a location about three-quarters of the way from the rear to the front of the frame.

At the forward side of the frame 10, a forward bale pickup and supporting cradle subassembly, designated generally by reference 32, is located and is pivotally journaled on the front tubular member 16 of the frame by means of a pair of transversely spaced tubular collars 34 and 36 which concentrically and rotatably surround the front tubular member 16.

In similar fashion, a rear bale pickup and supporting cradle subassembly, designated generally by reference numeral 38, is pivotally supported on the rear tubular member 18 of the rectangular frame 10 by means of a pair of tubular collars 40 and 42.

An elongated towing tongue 44 having an apertured towing bracket 46 at its forward end has its rear end 48 formed with flat surfaces on the upper and lower sides thereof and connected to the transverse axle 22 by means of a pivot bolt 52. The pivot bolt 52 is projected through a channel plate 54 secured to the underside of the centrally located fore-and-aft plate 24 by means of parallel vertical plates 25 as shown in FIG. 5. As shown in dashed and full lines in FIG. 2, this pivotal connection enables the towing tongue 44 to be pivoted from an aligned position to an angulated position with respect to the line of travel of the trailer.

For the purpose of swinging the towing tongue 44 from side to side, a towing tongue piston and cylinder subassembly 56 is provided and includes a hydraulic cylinder 58 which is pivotally pinned to the downwardly projecting cylinder attachment lug 30. The towing tongue piston and cylinder subassembly 56 also includes a piston rod 60 extending from the hydraulic cylinder 58 and having its free end pivotally attached to a lateral lug 62 secured to one side of the towing tongue 44.

The forward and rear bale pickup and supporting cradle subassemblies 32 and 38 are constructed similarly to each other, but the forward cradle subassembly differs slightly from the rear cradle subassembly in that it is modified to permit swinging movement of the towing tongue 44 to the position illustrated in full lines in FIG. 2 at certain times during operation of the bale retrieving and transporting trailer. The forward bale pickup and supporting cradle subassembly 32 includes a pair of vertically extending, substantially parallel upright tubular members 66 and 68 which are secured at their lower ends to substantially parallel generally horizontally extending pickup tines 70 and 72. As will be noted in referring to FIG. 3, the pickup tine 72 is angulated through a right angle adjacent its point of juncture with the upright tubular member 68. This angulation accommodates the tongue 44 when it is extended at an angle to the line of travel of the trailer.

A relatively large, generally triangular gusset plate 74 is welded across the lower inner corner of the forward cradle subassembly at the location where the vertically extending tubular member 66 intersects the horizontally extending pickup tine 70 at a right angle. The gusset plate 74 is welded to the tubular member 66 and pickup tine 70 and has a heel which projects inwardly toward the frame and is secured to the tubular collar 34. Similarly, a large outer gusset plate 76 is secured at the opposite side of the forward cradle subassembly by welding or otherwise securing to the vertically extending tubular member 68 and the horizontally extending pickup tine 72. The outer gusset plate 76 has a heel portion which projects toward the frame and is secured to the tubular collar 42. This gusset plate 76, however, is notched along its lower edge to be complementary in configuration to the angulation in the pickup tine 72. In generally similar fashion, outer gusset plates 78 and 80 are provided as a portion of the rear bale pickup and supporting cradle subassembly 38 and are secured to vertically extending parallel upright tubular members 84 and 86 and horizontally extending pickup tines 88 and 90 which are extended at right angles to each other similarly to the corresponding members in the forward bale pickup and supporting cradle subassembly 32.

At a location spaced upwardly from the lower ends of the vertically extending, parallel tubular members 66 and 68, a tubular transverse cross-brace 92 interconnects these upright tubular members. Another tubular transverse cross-brace 93 is spaced upwardly from the cross-brace 92 and interconnects the tubular members 66 and 68. The transverse cross-brace 93 carries, at a location intermediate its ends, an anchor plate 94 to which one end of a piston rod 98 forming a portion of an actuating piston and cylinder subassembly 100 is pivotally connected. The cylinder 102 of the piston and cylinder subassembly 100 is connected to the rear cylinder attachment lug 28. A pair of diagonal brace rods 102 and 104 are projected downwardly and forwardly from the transverse cross-brace 92 to the horizontally extending pickup tines 70 and 72 and are secured at their opposite ends to these structural elements to reinforce and strengthen the forward bale pickup and supporting cradle subassembly 32.

In similar fashion, a tubular transverse cross-brace (not shown) extends between the vertically extending parallel upright tubular members 84 and 86 of the rear bale pickup and supporting cradle subassembly 38. Another tubular transverse cross-brace 107 is spaced upwardly from the lower cross-brace and interconnects the tubular members 84 and 86. The cross-brace 107 carries an anchor plate 108 at a location intermediate its length. The anchor plate 108 is used as a point of pivotal connection of one end of a piston rod 110 forming a part of an actuating piston and cylinder subassembly 112. The cylinder 114 of the actuating piston and cylinder subassembly 112 is pivotally connected to the rear cylinder attachment lug 28. A pair of diagonal braces 116 and 118 extend between and interconnect the lower cross-brace with the corresponding horizontally extending pickup tines 88 and 90 included in the rear bale pickup and supporting cradle subassembly 38.

At the forward side of the rectangular frame 10, a tongue guiding box, designated generally by reference numeral 120, is secured to the front tubular member 16. The tongue guiding box 120 includes a slotted forward plate 122, a pair of opposed vertically extending end plates 124 and 126 and a slotted back plate 128. The tongue projects through the tongue guiding box 120 and is supported therein on a bottom plate which extends between the lower edges of the slotted front plate 122 and slotted back plate 128. The tongue guiding box 120 functions to aid in supporting and guiding the tongue at the forward end of the trailer as it undergoes its pivotal movement, and when it is not connected to a towing vehicle.

In the operation of the bale retrieving and transporting trailer of the invention, the trailer is coupled by the tongue 44 to a towing vehicle, such as a farm tractor or the like. The trailer is towed to a field where cylindrical hay bales are to be picked up and transported from the field. Upon arrival in the field, the towing tongue piston and cylinder subassembly 56 can be actuated to swing the tongue 44 from the dashed line position to the solid line position shown in FIG. 2. Continued towing then of the trailer will cause it to guide to the left side of the line of travel of the tractor, and will place it in a line of travel such that bales ahead of the trailer can be picked up.

It should be noted that at the time that the towing tongue piston and cylinder subassembly 56 is actuated to swing the towing tongue to the full line position indicated in FIG. 2, in which it extends at an angle to the line of travel of the trailer, the forward bale pickup and supporting cradle subassembly 32 has been pivoted upwardly to the cocked or elevated position shown in FIG. 1 by actuating the piston and cylinder subassembly 100 to retract the piston rod of this assembly. This enables the towing tongue 44 to be swung beneath the forward bale pickup and supporting cradle subassembly 32 by reason of the angulation formed in the horizontally extending pickup tine 72.

After the towing tongue 44 has been swung to the side and the trailer has moved to the left side of the line of travel of the towing tractor, the forward bale pickup and supporting cradle subassembly 32 is pivoted to its lowered position, as illustrated in FIG. 3 of the drawings. This is accomplished by actuation of the piston and cylinder subassembly 100 to extend the piston rod thereof. Continued towing of the trailer then directs the horizontally extending pickup tines 70 and 72 into the cylindrical hay bale, impaling the bale and allowing it then to be picked up upon the tines as the forward cradle subassembly is re-elevated to the position shown in FIG. 1.

After this time, the towing tongue 44 may be swung back to its dashed line position illustrated in FIG. 2 (in alignment with the line of travel of the towing tractor) to bring the trailer directly behind the tractor. At this time, the tractor or other towing vehicle may be backed so that, when the rear bale pickup and supporting cradle subassembly 38 is lowered by actuation of the piston and cylinder subassembly 112, the horizontally extending pickup tines 88 and 90 are oriented to impale a cylindrical bale to the rear of the trailer preparatory to lifting it up to the transport position in which the rear cradle subassembly 38 is elevated to the status shown in FIG. 1.

After two of the bales have been picked up in the manner described, the towing vehicle can tow the trailer to a point where the bales are to be unloaded. At this time, the rear bale can be immediately unloaded by lowering the rear bale pickup and supporting cradle subassembly 38 and moving the towing vehicle forward. The greatest convenience in unloading the forward bale will result from swinging the towing tongue 44 to one side, and then lowering the forward bale pickup and supporting cradle subassembly 32 to rest the lower side of the cylindrical bale on the ground. The tractor and trailer can then be backed to cause the tines 70 and 72 to be disengaged from the bale.

It is believed that the foregoing description of the invention will clarify the great simplicity, yet mechanical ruggedness, of the bale retrieving and transporting trailer of the invention. Although a preferred embodiment of the invention has been herein described, it will be understood that small changes and modifications of structure can be effected without departing from the basic principles which underlie the invention. Changes and innovations of this type are therefore deemed to be circumscribed by the spirit and scope of the appended claims or reasonable equivalents thereof.

What is claimed is:

1. A hay bale retrieving and transporting trailer comprising:
    a framework;
    ground-engaging wheels connected to the framework;
    an elongated towing tongue extending outwardly from one side of said framework and pivotally connected to said framework for pivotation about a vertical axis;
    a forward bale pickup and supporting cradle subassembly pivotally mounted on said one side of the framework for pivotation about a horizontal axis between a bale pickup position and a bale transporting position, said forward bale pickup and supporting subassembly including;
    a pair of bale pickup tines for piercingly engaging a bale spaced from each other and extending substantially horizontally in the bale pickup position of said forward bale pickup and supporting cradle subassembly, one of said tines in said pair of bale pickup tines defining an angulation adjacent the horizontal pivotal axis of said forward bale pickup and supporting cradle assembly for accommodating passage under said one tine in said pair of tines of said towing tongue during the pivotal movement of said towing tongue and when said forward bale pickup and supporting cradle subassembly is pivoted to said bale transporting position; and
    a vertically extending member connected at substantially a right angle to at least one of said bale pickup tines to cradle a hay bale with said one bale pickup tine;
    a rear bale pickup and supporting cradle subassembly pivotally mounted on said framework on the opposite side of said framework from said forward bale pickup and supporting cradle subassembly for pivotation about a horizontal axis between a bale pickup position and a bale transporting position, said rear bale pickup and cradle subassembly including: p2 at least one additional bale pickup tine for piercingly engaging a bale extending substantially horizontally in the bale pickup position of said rear bale pickup and mounting cradle subassembly; and
    whereby the bales are supported on said tines of said pickup and support cradle subassemblies during transport; and
    a vertically extending member connected at substantially a right angle to said last-mentioned bale pickup tine to cradle a hay bale with said last-mentioned pickup tine; and
    means for pivoting said towing tongue about said vertical axis.

2. A hay bale retrieving and transporting trailer as defined in claim 1 wherein said framework is rectangular and said towing tongue is pivotally connected to said framework at the center thereof.

3. A hay bale retrieving and transporting trailer as defined in claim 1 wherein said framework includes:
    a pair of opposed, parallel lateral frame members; and
    a pair of opposed, parallel front and rear frame members interconnecting said lateral frame members in a rectangle;

and wherein said trailer further includes a tongue guiding box secured to said front frame member and receiving said towing tongue therethrough.

4. A hay bale retrieving and transporting trailer comprising:
a rectangular framework;
ground-engaging wheels connected to the framework;
a forward bale pickup and supporting cradle subassembly pivotally mounted on one side of said framework for pivotation about a horizontal axis between a bale pickup position and bale transporting position, said forward bale pickup and supporting cradle subassembly including;
  at least one bale pickup tine for piercingly engaging a bale extending substantially horizontally in the bale pickup position of said forward bale pickup and supporting cradle subassembly; and
  a vertically extending member connected at substantially a right angle to said bale pickup tine to cradle a hay bale with said bale pickup tine;
a rear bale pickup and supporting cradle subassembly pivotally mounted on said framework on the opposite side of said framework from said forward bale pickup and supporting cradle subassembly and for pivotation about a horizontal axis between a bale pickup position and a bale transporting position, said rear bale pickup and cradle subassembly including:
  at least one bale pickup tine for piercingly engaging a bale extending substantially horizontally in the bale pickup position of said rear bale pickup and mounting subassembly; and
  whereby the bales are supported on said tines of said pickup and support cradle subassemblies during transport; and
  a vertically extending member connected at substantially a right angle to said last-mentioned bale pickup tine to cradle a hay bale with the last-mentioned pickup tine;
an axle extending laterally across the center of said framework parallel to the axes of pivotation of said bale pickup and supporting cradle subassemblies and carrying said wheels on opposite ends thereof;
an elongated towing tongue extending outwardly from said one side of said framework; and
means pivotally interconnecting said axle and said towing tongue for pivotation of said towing tongue about a vertical axis; and
means for pivoting said towing tongue about said vertical axis.

5. A hay bale retrieving and transporting trailer as defined in claim 4 wherein said means for pivoting said towing tongue comprises:
a towing tongue piston and cylinder subassembly including a piston rod attached to the towing tongue at a location spaced from the point of pivotal attachment of the tongue to the framework and including a hydraulic cylinder; and
a downwardly projecting cylinder attachment lug secured to one of said opposed lateral frame members and having an end of said hydraulic cylinder attached thereto.

6. A hay bale retrieving and transporting trailer as defined in claim 4 wherein said towing tongue is pivotally connected at one of its ends to the center of said framework.

7. A hay bale retrieving and transporting trailer comprising:
a framework, including:
  a pair of opposed, parallel lateral frame members; and
  a pair of opposed, parallel front and rear frame members interconnecting said lateral frame members in a rectangle;
ground engaging wheels connected to said framework;
a centrally located fore-and-aft plate having its opposite ends secured to said front and rear frame members;
a forward bale pickup and supporting cradle subassembly pivotally mounted on one side of said framework for pivotation about a horizontal axis between a bale pickup position and a bale transporting position, said forward bale pickup and supporting cradle subassembly including:
  at least one bale pickup tine for piercingly engaging a bale extending substantially horizontally in the bale pickup position of said forward bale pickup and supporting cradle subassembly; and
  a vertically extending member connected at substantially a right angle to said bale pickup tine to cradle a hay bale with said bale pickup tine;
a first actuating piston and cylinder subassembly connected between said centrally located fore-and-aft plate and said forward bale pickup and supporting cradle subassembly;
a rear bale pickup and supporting cradle subassembly pivotally mounted on said framework on the opposite side of said framework from said forward bale pickup and supporting cradle subassembly for pivotation about a horizontal axis between a bale pickup position and a bale transporting position, said rear bale pickup and cradle subassembly including:
  at least one bale pickup tine for piercingly engaging a bale extending substantially horizontally in the bale pickup position of said rear bale pickup and mounting cradle subassembly; and
  whereby the bales are supported on said tines of said pickup and support cradle subassemblies during transport; and
  a vertically extending member connected at substantially a right angle to said last-mentioned bale pickup tine to cradle a hay bale with said last-mentioned bale pickup tine;
a second actuating piston and cylinder subassembly connected between said centrally located fore-and-aft plate and said rear bale pickup and supporting cradle subassembly;
an elongated towing tongue extending outwardly from said one side of said framework and pivotally connected to said framework for pivoting about a vertical axis;
means for pivoting said towing tongue about said vertical axis; and
a tongue guiding box secured to said front frame member and receiving said towing tongue therethrough;
an axle extending laterally across the center of said framework parallel to the axis of pivotation of said cradle subassemblies and carrying said wheels on opposite ends thereof.

8. A hay bale retrieving and transporting trailer comprising:

a framework, including:
- a pair of opposed, parallel lateral frame members; and
- a pair of opposed, parallel front and rear frame members inconnecting said lateral frame members;

ground-engaging wheels connected to said framework;

a centrally located fore-and-aft plate having its opposite ends secured to said front and rear frame members;

a forward bale pickup and supporting cradle subassembly pivotally mounted on one side of said framework for pivotation about a horizontal axis between a bale pickup position and a bale transporting position, said forward bale pickup and supporting cradle subassembly including:
- at least one bale pickup tine for piercingly engaging a bale extending substantially horizontally in the bale pickup position of said forward bale pickup and supporting cradle subassembly; and
- a vertically extending member connected at substantially a right angle to said pickup tine to cradle a hay bale with said bale pickup tine;

a first actuating piston and cylinder subassembly connected between said centrally located fore-and-aft plate and said forward bale pickup and supporting cradle subassembly;

a rear bale pickup and supporting cradle subassembly pivotally mounted on said framework on the opposite side of said framework from said forward bale pickup and supporting cradle subassembly for pivotation about a horizontal axis between a bale pickup position and a bale transporting position, said rear bale pickup and cradle subassembly including:
- at least one bale pickup tine for piercingly engaging a bale extending substantially horizontally in the bale pickup position of said rear bale pickup and mounting cradle subassembly; and
- whereby the bales are supported on said tines of said pickup and support cradle subassemblies during transport; and
- a vertically extending member connected at substantially a right angle to said last-mentioned bale pickup tine to cradle a hay bale with said last-mentioned bale pickup tine;

a second actuating piston and cylinder subassembly connected between said centrally located fore-and-aft plate and said rear bale pickup and supporting cradle subassembly;

an elongated towing tongue extending outwardly from said one side of said framework and pivotally connected to said framework for pivotation about a vertical axis; and means for pivoting said towing tongue about said vertical axis;

an axle extending laterally across the center of said framework parallel to the axis of pivotation of said cradle subassemblies and carrying said wheels on opposite ends thereof.

9. A hay bale retrieving and transporting trailer comprising:

a rectangular framework;

ground-engaging wheels;

an axle extending laterally across the center of said framework and carrying said wheels on opposite ends thereof;

an elongated towing tongue extending outwardly from one side of said framework;

means pivotally interconnecting said axle and said towing tongue;

a bale pickup and supporting cradle subassembly pivotally mounted on said one side of said framework for pivotation about a horizontal axis extending substantially parallel to said axle between a bale pickup position and a bale transporting position, said bale pickup and supporting cradle subassembly including:
- a pair of horizontally spaced bale pickup tines for piercingly engaging a bale each extending substantially horizontally in the bale pickup position of said bale pickup and supporting cradle subassembly whereby the bale is supported on said tines of said pickup and support cradle subassembly during transport, one of said bale pickup tines in said pair defining an angulation adjacent the horizontal pivotal axis of said bale pickup and supporting cradle subassembly for accommodating passage under said one bale pickup tine in said pair of bale pickup tines of said towing tongue during the pivotal movement of said towing tongue and when said forward bale pickup and supporting cradle subassembly is pivoted to said bale transporting position; and
- a vertically extending member connected to at least one of said bale pickup tines to cradle a hay bale with said one bale pickup tine; and means for pivoting said towing tongue about a vertical axis located at the center of said framework.

* * * * *